April 25, 1972  E. SCHICKEDANZ  3,658,971
METHOD OF MOLDING POLYURETHANE FOAM COMPOSITTES
AND REMOVING THEM FROM THE MOLD
Filed Dec. 29, 1969  3 Sheets-Sheet 1
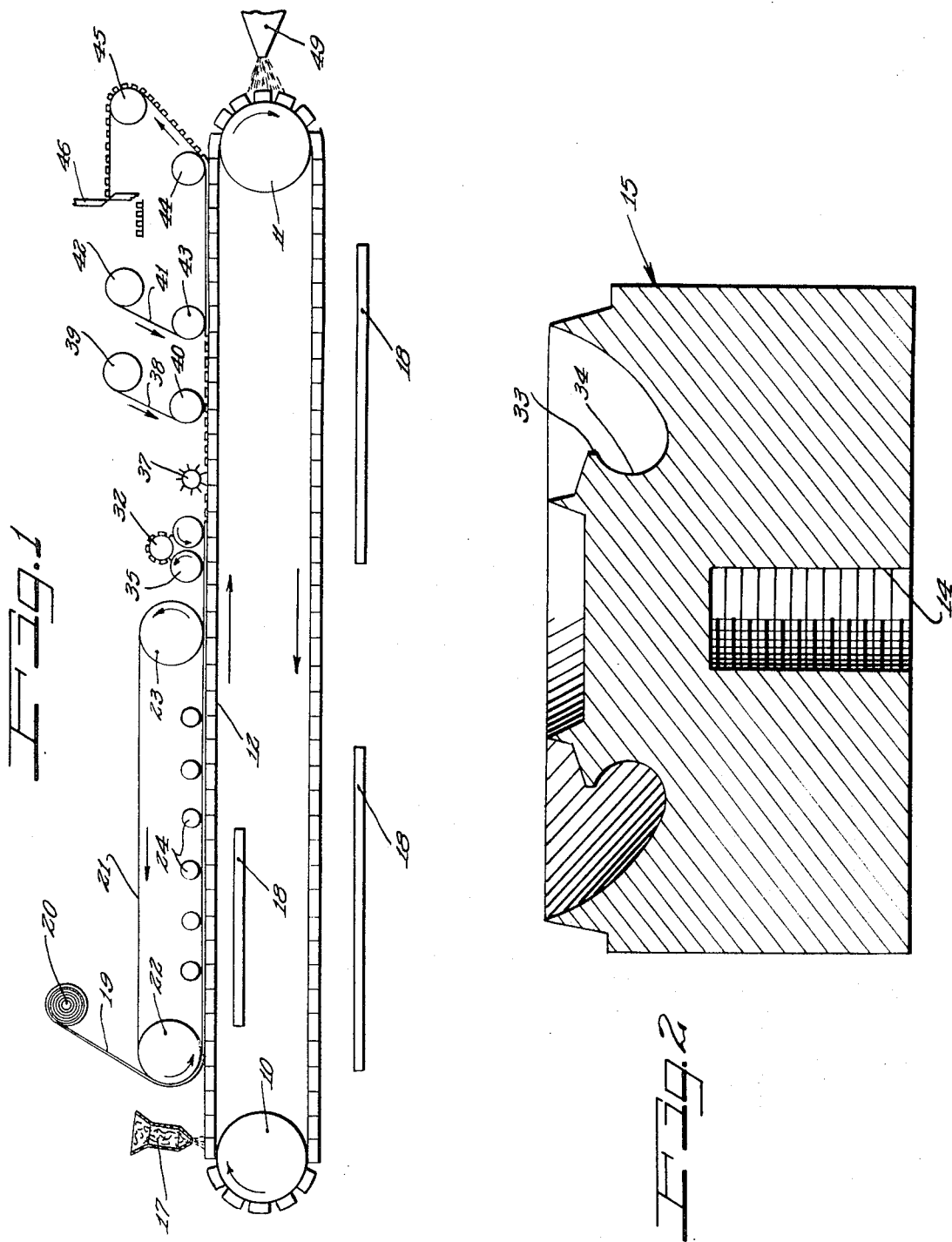
INVENTOR.
Erich Schickedanz
BY  ATTORNEYS

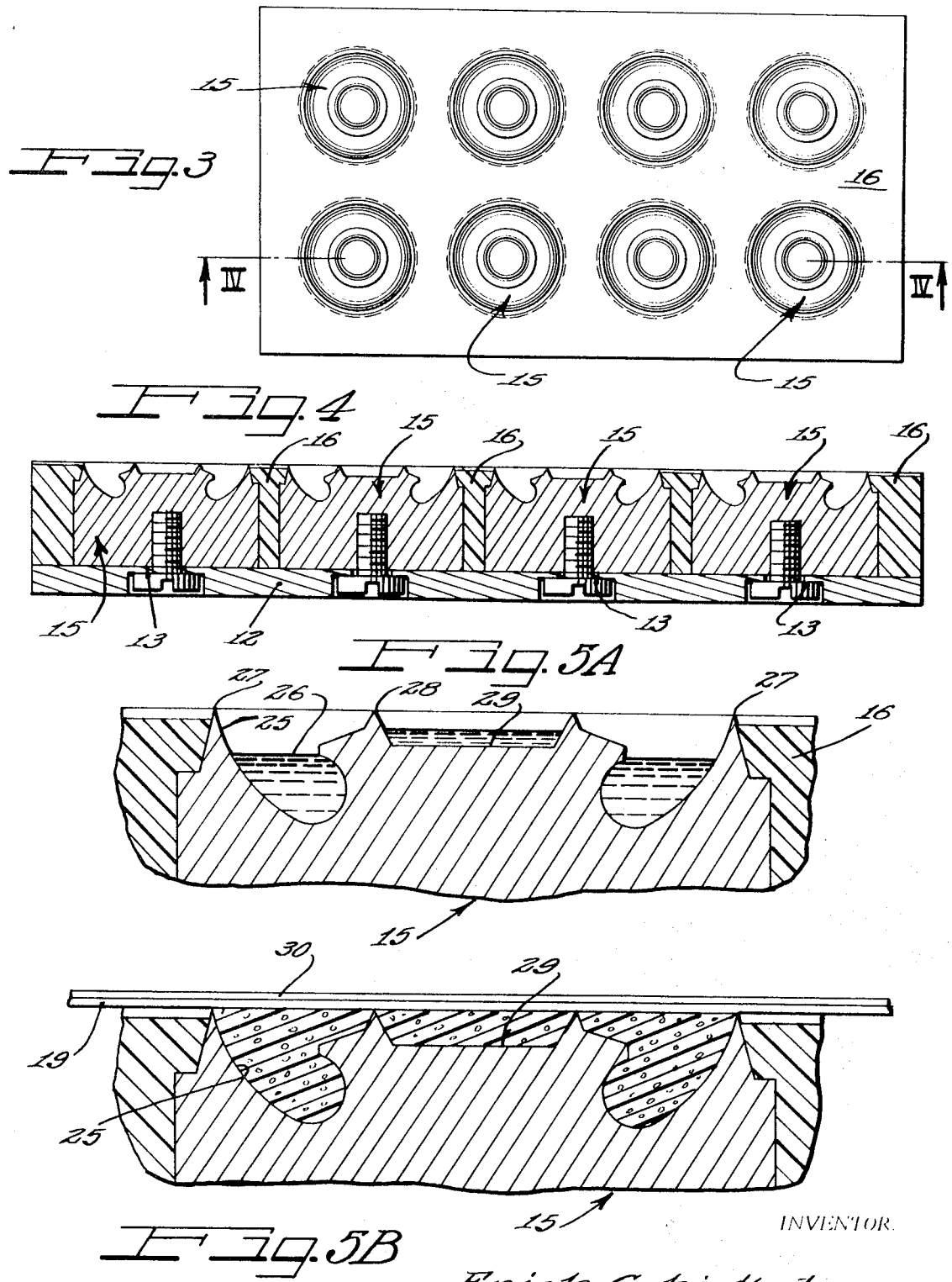

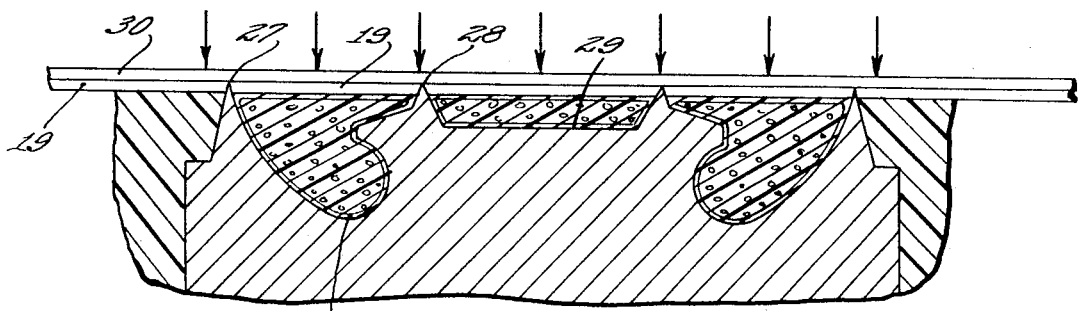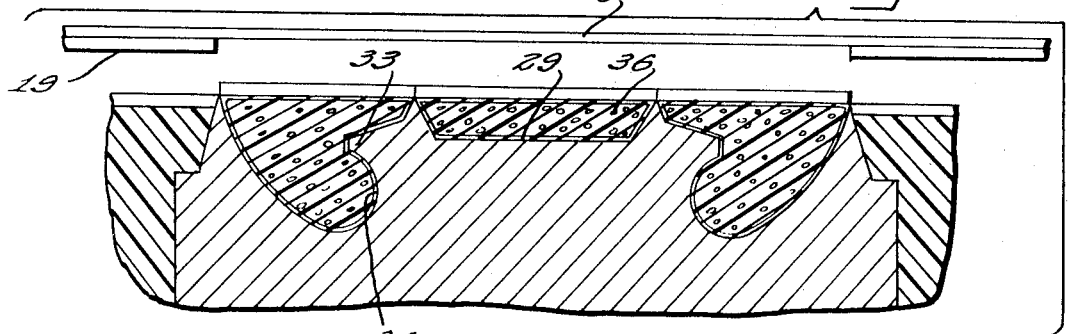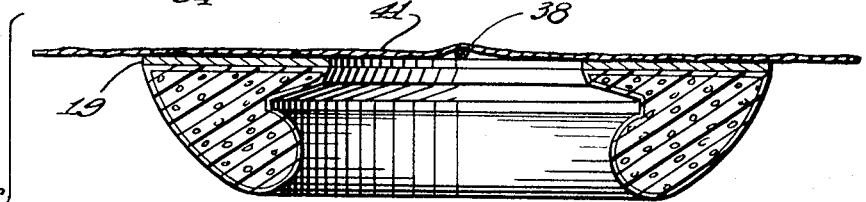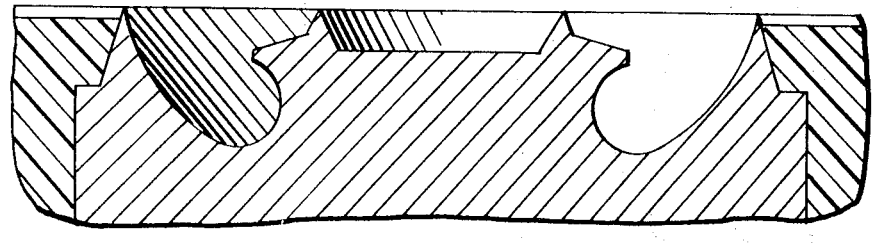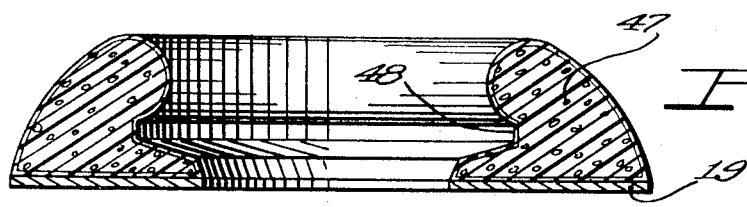

United States Patent Office 3,658,971
Patented Apr. 25, 1972

3,658,971
METHOD OF MOLDING POLYURETHANE FOAM COMPOSITES AND REMOVING THEM FROM THE MOLD
Erich Schickedanz, Illereichen-Altenstadt, Germany, assignor to The Scholl Mfg. Co., Inc., Chicago, Ill.
Filed Dec. 29, 1969, Ser. No. 888,575
Int. Cl. B29d 27/04
U.S. Cl. 264—45                                    7 Claims

ABSTRACT OF THE DISCLOSURE

Method for the continuous production of molded cushioning devices wherein a foamable composition is injected into the molding cavity of an open ended mold, a web having an adhesived surface is applied over the open end of the mold, pressure is applied on the adhesived material to provide a closure for the mold cavity, the foam in the mold is permitted to expand into conformity with the molding cavity while the cavity is closed by the adhesived surface, the resulting foamed product and the adhesived strip adhering thereto are severed, applying a web of pressure-sensitive adhesive-receptive material onto the molded product and then the resulting laminated structure is lifted from the mold.

BACKGROUND OF THE INVENTION

Field of the invention

This invention is in the field of molding flexible foam products wherein a foamable composition such as a polyurethane foam or the like is injected into a plurality of molds on a conveyor, the molds are closed by means of a strip which contains a pressure sensitive adhesive on both surfaces thereof, the foamable composition is expanded in the mold while the mold is closed by the adhesive containing strip, the resulting laminated structure is severed along the periphery of the mold and then is lifted from the mold by applying an adhesive receptive web to the laminated structure, the final product being amenable, after slitting, for packaging.

DESCRIPTION OF THE PRIOR ART

There are many different types of molded foam cushions that are used in large quantities in shoes and for various orthopedic uses, such as metatarsal pads, heel cushions, insoles, inserts, corn rings and the like. These products are normally made from foam rubber, sponge rubber or polyvinyl chloride foam. In the method which is usually used to make these products, a latex foam is poured into individual molds or onto a belt which has molds provided in it. The foam is gelled and cured in hot air or steam. The molded parts then have to be dried, which results in a shrinkage of approximately ten percent. Upon completion of the drying, the individual pieces are laminated to pieces of imitation leather or textiles, and to an adhesive layer or film which is usually provided on such products. These operations are time consuming and expensive, because each individual cushion has to be essentially finished by hand.

In the manufacture of corn rings, it is common practice to apply a tacky adhesive layer to felt sheets from which the corn rings are die cut and are placed individually on a release backing containing a lifting thread. These rings can then be beveled by means of a knife or by grinding to make a ring which has a smoothly rounded outside contour. In this method, there are also a number of individual manufacturing steps necessary for the manufacture of the ring, making the manufacturing process relatively expensive.

It has also been proposed that highly elastic molded cushions could be made from polyurethane ether foam. This type of foam is normally made in large, individual closed molds, as it has not been considered feasible to manufacture very small molded items from this type of foam.

SUMMARY OF THE INVENTION

The present invention provides a method and apparatus for the continuous molding of small molded products such as corn rings and is applicable to various types of foamable resinous compositions and to foam rubber. One of the features of the present invention resides in providing a cover layer for the individual molds consisting of a strip which has a pressure sensitive adhesive on both surfaces thereof. While the mold is covered with the adhesived strip, the foaming reaction proceeds within the molding cavity, the reaction being either chemical as in the case of polyurethane foams or physical as in the case of polyvinyl chloride foams. In the preferred form of the present invention, the individual mold peripheries are provided with a knife edge so that upon completion of the expansion of the foamable material into conformity with the molding cavity the application of pressure against the knife edges causes the adhesived strip which is strongly secured to the expanded cellular foam of the mold to be severed. The resulting laminated product consisting of the molded foam and the strip secured thereto can then be lifted out of the mold by applying a web of adhesive receptive material and exerting a pulling force on this web. This adhesive receptive web then serves as the release backing for the final product and all that remains to be done is to sever the adhesive receptive web into strips of suitable length for packaging.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view of a continuous molding assembly which can be used for the purposes of the present invention;

FIG. 2 is a cross-sectional view on a greatly enlarged scale of one of the individual molds of the present invention;

FIG. 3 is a plan view of a typical mold assembly, including eight individual molds;

FIG. 4 is a cross-sectional view taken substantially along the line IV—IV of FIG. 3;

FIGS. 5A through 5E are diagrammatic representations of various portions of the process involved; and FIG. 6 is a greatly enlarged cross-sectional view of a corn ring produced according to the present invention.

DESCRIPTION OF THE PREFERRED EMBODIMENTS

In FIG. 1 there is shown a pair of rollers 10 and 11 between which a continuous endless belt 12 is trained. Secured to the belt 12 is a plurality of rigid mold sections best illustrated in FIGS. 3 and 4 of the drawings. As illustrated in FIG. 4, the mold sections may be secured to the belt 12 by means of bolts 13 which are threadedly received within internally threaded bores 14 in each of the mold sections. The individual molds of the assembly are identical and have each been identified at reference numeral 15. As best seen in FIG. 4, the individual mold assemblies 15 are separated from each other by rubber or similar elastic material 16.

As the conveyor belt 12 moves from left to right as seen in FIG. 1, the individual molding cavities of the mold assembly are partially filled with a foamable composition which is injected therein by means of a spray gun 17 or other suitable injecting device. Doctor blades or knives (not shown) can be used to spread the material over the entire face of the mold block, as it is not necessary to confine the foamable composition exactly to the molding cavities.

The molds on the conveyor belt are continuously heated by suitable heating devices such as infrared units 18 positioned along the path of travel of the belt. Shortly after the foamable material is injected into the mold by means of the spray gun 17, an adhesive strip 19 is applied over the molding cavities to form a closure for the open ended mold. The strip 19 is received from a supply roll 20 and is applied to the molding cavities by means of a continuous conveyor belt 21 contained between a pair of rolls 22 and 23. The adhesive strip 19 has a pressure sensitive adhesive on both surfaces thereof. This strip can be composed of a plastic film, a non-woven material, a paper or a fabric. The adhesive masses on both surfaces can be different or identical. Such pressure sensitive adhesive masses are well known in the art and may consist, for example, of acrylic compounds or various polyvinyl alkyl ethers, particularly the isobutyl ethers. Such pressure sensitive adhesive masses can also be formulated from natural or synthetic rubbers, including resins, plasticizers, fillers and anti-oxidants. The choice of a particular pressure sensitive system will be governed by the intended use of the product.

The doubly coated strip 19 serves as a closure for the molding cavities during the time the foamable composition is expanding to fill the molding cavity. During such time, the strip 19 is urged tightly against the mold by means of pressure rollers 24 which press against the conveyor belt 21.

The adhesive strip 19 at its exposed or outer surface is covered with a release paper such as a silicone treated paper so that the strip 19 can be readily unwound from the roll 20.

Turning now to the sequence of drawings shown in FIG. 5, FIG. 5A illustrates the condition which exists shortly after a foamable composition has been sprayed into the individual mold assemblies 15. As best seen from this figure, each individual mold assembly 15 includes an annular molding cavity 25 into which a foamable composition 26 has been injected to a level of about 70% or so of the depth of the molding cavity. The outer periphery of the molding cavity is provided with a knife edge 27, and a circular knife edge 28 defines a core forming portion which is ultimately removed from the final product. As illustrated in FIG. 5A, additional amounts of the foamable composition 26 may be received in the recess 29 surrounded by the circular knife edge portion 28.

In FIG. 5B, the double sided pressure sensitive tape 19 with its covering silicone release paper 30 is shown applied over the molding assembly so that the tape 19 serves to close the open end of the molding cavity 25 and also the recess 29. In a matter of seconds or a few minutes, the foamable composition 26 expands by virtue of a chemical reaction or a physical reaction to completely conform to the configuration of the molding cavity 25.

As the foaming reaction progresses, the material in the molding cavity starts to develop a skin 31 which is relatively non-porous. Then, after sufficient pressure has been applied by the pressure roll 24, as indicated by the arrows in FIG. 5C, the pressure sensitive tape 19 is forced against the knife edges 27 and 28 with sufficient force to sever the pressure sensitive tape 19 at the periphery of the molding cavity, but the pressure does not apply for a distance sufficient to sever the overlying silicone release paper 30. Then, as illustrated in FIG. 5D, the silicone release paper 30 as well as the adjoining portions of the pressure sensitive tape 19 can be deleted from the material in the mold by means of a set of rolls. As illustrated in the various views, the molding cavity has an inwardly extending projection 33 which forms an undercut surface 34 serving to retain the molded resinous material within the mold cavity at the time the silicone release paper 30 and the remaining pressure sensitive tape 19 is pulled from the molding cavity by means of a roll 35. The resulting lattice-like structure can be rolled up on a roll 32.

The center core of the molded ring, identified at reference numeral 36 has a tendency to remain in the recess 29 and is removed by means of a profiled roll 37.

A separating thread 38 is applied to the molded rings while still in the cavity, the thread being supplied from a roll 39. A pressure roll 40 presses the separating thread 38 against the exposed adhesive surface of the layer 19.

An adhesive receptive surface for use as a backing on the finished article is provided by applying a web 41 of such material from a roll 42 and pressing it on the exposed adhesive surface of the molded product by means of a pressure roll 43. The web 41 may be embossed or smooth, and may consist of material such as a non-plasticized polyvinyl chloride, or polyethylene. The web 41 adheres quite strongly to the adhesived surface of the molded product and as the resulting laminated structure is passed under a lifting roll 44 and then over a roll 45, the pulling force exerted by the web 41 is sufficient to lift the molded foam product out of the molding cavity as best illustrated in FIG. 5E. The lifting roll 44 is covered with rubber or a plastic foam. Finally, the molded product still adhering to the web 41 is severed into individual units by means of a pair of knives 46 after which they can be immediately packaged.

The finished product is illustrated in FIG. 6 of the drawings. The cushioning is provided by the molded foam body 47 to which the doubly adhesived strip 19 adheres. The provision of the undercut in the molding cavity provides an inwardly extending annular groove 48. This groove makes it possible for the corn ring to absorb additional amounts of deflection without transferring the pressure thereof to the affected area.

Returning to FIG. 1, it will be seen that the belt 12 is sprayed with a suitable release material such as "Carbowax" or metal soap by means of a spray gun 49.

Many different types of foamable compositions can be used in accordance with the present invention. One particularly preferred form is a polyurethane composition which is based upon polyoxyalkylene polyols. Particularly good results are obtained as far as the physical properties of the foam are concerned by using a mixture of a polypropylene ether triol resulting from the condensation of glycerine and propylene oxide combined with a polyether glycol resulting from the condensation of ethylene glycol with ethylene oxide.

The foam can be made from a two component system in which the polyols, catalysts, a silicone, blowing agents and water are included in one component, and the isocyanate is included in the other. The polyol component typically may include for each 100 parts from 10–25 parts by weight of the polyoxyalkylene triol, 20–40 parts by weight of the polyoxyalkylene glycol, up to 0.6 part by weight of one or more catalysts, and about 25–35 parts by weight of a blowing agent, the exact amount depending upon the density desired. The blowing agent is preferably "Freon 11" which is the chlorofluoromethane. The blowing agent may also include a volatile material such as methylene chloride which assists in forming the relatively non-porous skin on the molded product. A silicone and water are also included.

The amount of isocyanate used is governed strictly by stoichiometric considerations. An amount of isocyanate will be added sufficient to react completely with the hydroxyl groups of the polyols present, plus an additional 5% molecular excess or so. Diphenylmethanediisocyanate is particularly preferred for use in this process because of its non-toxic properties. However, other conventionally used isocyanates such as toluene diisocyanate and other conventional urethane formers can also be used.

One particularly preferred formula for producing a polyurethane foam in accordance with the present invention is given below:

FORMULA 1

| Component A: | Parts by weight |
|---|---|
| Polypropylene ether triol (M.W. 1500) | 15 |
| Polyethylene glycol ether (M.W. 2000) | 30 |
| Dibutyl tin dilurate | 0.5 |
| Triethylenediamine | 0.08 |
| Trichlorofluoromethane | 30 |
| Silicone DC 190 | 0.8 |
| Water | 1.8 |

| Component B: | |
|---|---|
| Diphenylmethane Diisocyanate | 38.5 |

Another suitable formula for a somewhat firmer foam employs one of the many triols in the range of molecular weight 1500 to 5000 with hydroxyl numbers ranging from 110 to 35 and the addition of 1–100 parts of an inorganic filler as, for instance, calcium carbonate or barium sulphate. Formula 2 is an example of such a composition:

FORMULA 2

| Component A: | Parts by weight |
|---|---|
| Polypropylene ether triol hydroxyl number 43.5 to 48.5 | 100 |
| Water | 2 |
| Trichlorofluoromethane | 8 |
| Filler | 1–100 |
| Silicone DC 190 | 1.5 |
| Triethylene diamine | 0.2 |
| N-ethyl morpholine | 0.2 |
| Stannous octoate | 0.275 |
| Component B—Toluene diisocyanate | 28.4 |

Components A and B can be mixed together briefly and then applied by means of the psray gun as illustrated in the drawings. The foaming, reaction and polymerization of the components to form a polyurethane ether foam takes about 3 to 5 minutes. The specific gravity of the foam is between 0.06 and 0.12 depending upon the ratio of ingredients.

The foam cushions according to the present invention can also be produced from mechanically foamed systems such as polyvinyl chloride plastisols. Such systems include for every 100 parts by weight from 40–60 parts of a vinyl homopolymer or copolymer, and the balance being an alkyl phthalate plasticizer. Stabilizers, foaming agents and pigments. For example, a suitable composition may include the following igrnedients:

| | Parts by weight |
|---|---|
| Dispersible polyvinyl chloride (e.g. "Goodrich 121") | 50 |
| Dibutyl phthalate | 40 |
| Foaming agent (e.g. Vanderbilt "Fomade") | 8 |
| Zn-CD stabilizer | 1 |
| Pigments | 1 |

This foamed polyvinyl chloride paste can be spread on the molding assembly and heated to cause gelling before the doubly surfaced adhesive tape is applied over the molding cavities. The polyvinyl chloride foam gels within about 1 minute at approximately 180° C. After gelling, the composition may be cooled by means of a cooling roll. The application of the doubly adhesive tape as well as the rest of the process is the same as described in connection with FIG. 1.

Another material which can be used for the purpose of the present invention is a polyvinyl chloride plastisol paste which contains a blowing agent such as azodizarbonamide. In this case, the polyvinyl chloride paste is spread upon the mold assembly with a rubber elastic spreader or a knife in such a way that the individual mold cavities are filled only to about 50 to 70% with polyvinyl chloride paste. The filling of the mold occurs during approximately two minutes at 180° C., in a heating and gelling zone, during which the mold belt is covered with a heat resistant paper, a silicone tape, or "Teflon." After blowing and gelation, cooling is applied by means of a roll or blower and the adhesive tape is attached and the product finished as described previously.

From the foregoing, it will be understood that the process and apparatus of the present invention provide an economical, quick continuous process for molding of small articles of synthetic foams.

I claim as my invention:

1. The method of continuously molding a foamed product which comprises injecting a foamable composition selected from the group consisting of polyurethane foams and polyvinyl chloride foams into the molding cavity of an open ended mold having a knife edge at its outer periphery, applying an adhesived strip having pressure sensitive adhesive on both surfaces thereof over the open end of the mold to close the same, applying pressure on said adhesived strip to thereby provide a closure for the mold cavity, keeping said closure applied while said composition expands by foaming into conformity with the molding cavity, severing the resulting foamed product and the adhesived strip adhering thereto from the remainder of said strip at the outer periphery of the mold while the foamed product is still in the mold by applying pressure against said knife edge, applying a web of pressure-sensitive adhesive receptive material onto the molded article, and lifting the molded article from its mold by means of said web.

2. The method of claim 1 in which said foamable composition is a one-shot foamable polyurethane former.

3. The method of claim 1 in which said foamable composition is a foamable polyvinyl chloride composition.

4. The method of claim 1 in which said adhesived strip has a pressure sensitive adhesive on both surfaces thereof.

5. The method in accordance with claim 1 in which said adhesived strip is applied over the open ends of a plurality of adjacent molds to form a closure for said molds and the resulting laminated structures in said molds are lifted from the molds by a single web applied to the structures in said molds.

6. The method of continuously molding a foamed product which comprises injecting a foamable composition selected from the group consisting of polyurethane foams and polyvinyl chloride foams into the molding cavity of an open ended mold having a knife edge at its outer periphery, applying a double-sided adhesived strip, having a covering release paper on the outer surface, over the open end of the mold, applying pressure on said adhesived strip to thereby provide a closure for the mold cavity, keeping said closure applied while said composition expands by foaming into conformity with the molding cavity and said strip becomes secured to the expanded foam product, severing the resulting foamed product and the adhesived strip adhering thereto from the remainder of said strip at the outer periphery of the mold while the foamed product is still in the mold by applying pressure against said knife edge without severing said release paper, removing from the mold said release paper and the portion of said strip surrounding said molding cavity, applying a web of pressure-sensitive adhesive-receptive material onto the molded product, and then lifting the resulting laminated structure from the mold by means of said web.

7. The method in accordance with claim 6 in which said adhesived strip is applied over the open ends of a plurality of adjacent molds to form a closure for said molds and the resulting laminated structures in said molds are lifted from the molds by a single web applied to the structures in said molds.

References Cited

UNITED STATES PATENTS

| | | | |
|---|---|---|---|
| 2,217,137 | 10/1940 | Roth | 156—79 X |
| 2,948,651 | 8/1960 | Waag | 264—45 X |
| 3,049,463 | 8/1962 | Kallander | 156—78 X |
| 3,098,262 | 7/1963 | Wisotzky | 264—214 X |
| 3,173,826 | 3/1965 | Campbell | 156—238 X |
| 3,187,069 | 6/1965 | Pincus | 264—45 |
| 3,262,827 | 7/1966 | Kallander | 264—47 X |
| 3,351,510 | 11/1967 | Harris | 264—214 X |
| 3,475,526 | 10/1969 | Seto | 264—153 |

DONALD J. ARNOLD, Primary Examiner

P. A. LEIPOLD, Assistant Examiner

U.S. Cl. X.R.

18—4 B, 4 C; 156—79, 232; 265—47, 334